(12) United States Patent
Horstman et al.

(10) Patent No.: US 8,936,671 B2
(45) Date of Patent: Jan. 20, 2015

(54) AIRCRAFT CABIN AIR ENTRAINMENT FILTRATION WITH CONDENSATION DRAIN

(71) Applicant: The Boeing Company, Chicago, IL (US)

(72) Inventors: Raymond H. Horstman, Snohomish, WA (US); EdmundFidelino P. Cordero, Snohomish, WA (US); Richard A. Johnson, Edmonds, WA (US); Chao-Hsin Lin, Redmond, WA (US)

(73) Assignee: The Boeing Company, Chicago, IL (US)

( * ) Notice: Subject to any disclaimer, the term of this patent is extended or adjusted under 35 U.S.C. 154(b) by 70 days.

(21) Appl. No.: 13/774,162

(22) Filed: Feb. 22, 2013

(65) Prior Publication Data
US 2014/0238234 A1    Aug. 28, 2014

(51) Int. Cl.
*B01D 46/00*  (2006.01)
*F24F 13/02*  (2006.01)
*B64D 13/06*  (2006.01)

(52) U.S. Cl.
CPC ............... *F24F 13/02* (2013.01); *B64D 13/06* (2013.01); *B64D 2013/0625* (2013.01); *B64D 2013/0651* (2013.01); *B64D 2013/0688* (2013.01)
USPC ............. 95/273; 96/224; 55/385.2; 55/385.3; 422/4; 422/24; 422/121; 454/187; 454/76; 244/118.5

(58) Field of Classification Search
USPC ............. 55/385.1, 385.2, 413, 415, 418, 471, 55/472, 473, 361, 306; 454/187, 230, 232, 454/237, 246, 248
See application file for complete search history.

(56) References Cited

U.S. PATENT DOCUMENTS

| | | | |
|---|---|---|---|
| 7,591,869 B2 * | 9/2009 | Jensen et al. | 55/396 |
| 7,789,346 B2 | 9/2010 | Horstman et al. | |
| 8,206,475 B2 * | 6/2012 | Walkinshaw | 55/385.2 |
| 2006/0026936 A1 * | 2/2006 | Paumier et al. | 55/473 |
| 2010/0237155 A1 * | 9/2010 | Sanford | 236/49.3 |
| 2014/0020347 A1 * | 1/2014 | Schoenherr et al. | 55/385.1 |

* cited by examiner

*Primary Examiner* — Duane Smith
*Assistant Examiner* — Minh-Chau Pham
(74) *Attorney, Agent, or Firm* — Joseph M. Rolnicki; Evans & Dixon, LLC

(57) ABSTRACT

An aircraft has a ventilation system that employs a plurality of nozzles positioned in a cavity between a sidewall of the aircraft cabin and a section of the aircraft fuselage. The nozzles receive a supply of ventilation air and direct jets of air from the nozzles, through the cavity and into the aircraft cabin. The jets of air produced by the nozzles create low-pressure areas in the cavity. At least one return air opening in the cabin sidewall communicates the low-pressure areas with the cabin interior, whereby the low pressure areas draw air from the cabin interior into the cavity where the drawn air is entrained with the jets of air produced by the nozzles. Devices inside the cavity remove suspended impurities from the air drawn into the cavity. In this manner, the ventilation system filters or sanitizes the air drawn through the system.

18 Claims, 5 Drawing Sheets

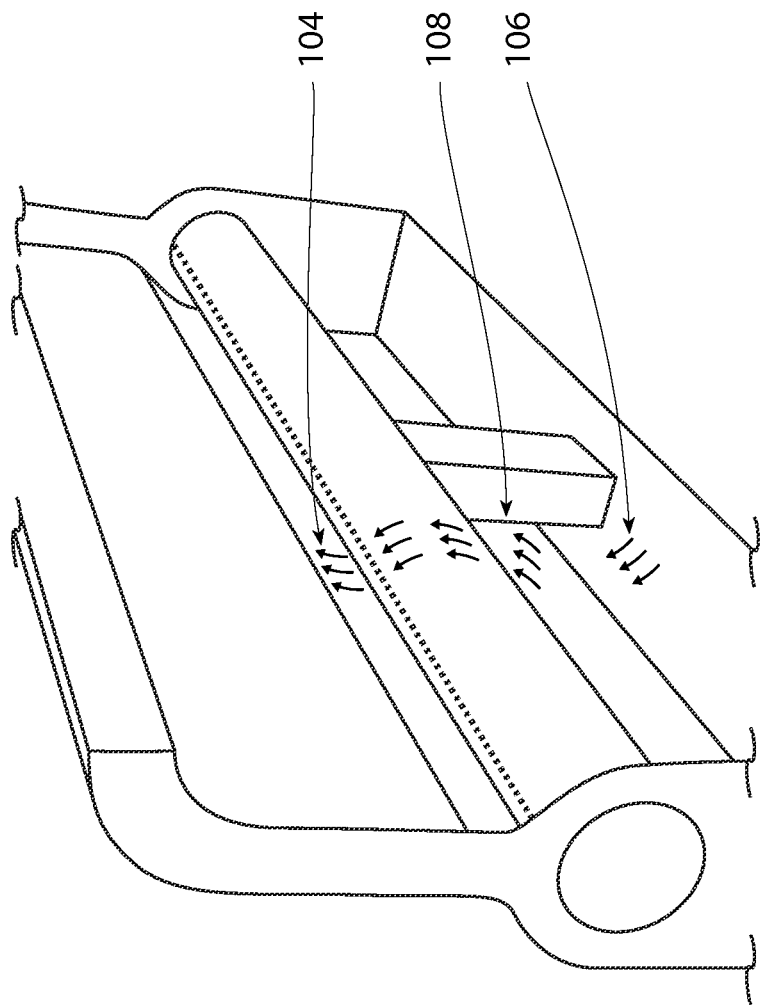

AIRCRAFT CABIN AIR ENTRAINMENT FILTRATION WITH CONDENSATION DRAIN

FIELD OF THE INVENTION

The present invention pertains to an aircraft cabin ventilation system that uses the momentum of a jet of air ejected from a nozzle to draw cabin air through a filter or other device to sanitize the air before returning it to the cabin, thereby increasing the total apparent ventilation rate to the cabin without enlarging the ventilation system of the aircraft. In particular, the present invention pertains to a ventilation system that employs a plurality of nozzles positioned in a cavity between a sidewall of the aircraft cabin and a section of the aircraft fuselage. The nozzles receive a supply of ventilation air and direct jets of air from the cavity and into the aircraft cabin, with the jets of air creating low pressure areas in the cavity. Ventilation openings in the cabin sidewall communicate the low pressure areas with the cabin interior, whereby the low pressure areas draw air from the cabin interior into the cavity where the drawn air is entrained into the jets of air produced by the nozzles. Devices inside the cavity remove suspend impurities from the air drawn into the cavity. In this manner, the ventilation system of the invention filters or sanitizes the air drawn through the system and thereby increases the total apparent ventilation rate to the aircraft cabin without enlarging the ventilation system of the aircraft.

BACKGROUND

Commercial aircraft set up for the transportation of passengers typically include rows of seats along the length of the aircraft cabin. Because the primary purpose of this type of commercial aircraft is to transport passengers, the aircraft cabin is usually set up to maximize the number of seats in the cabin. However, increasing the number of seated passengers in the aircraft cabin also increases the potential for the transfer of microorganisms or other air suspend impurities between the passengers in the aircraft cabin.

The potential problem of airborne disease or other air suspended impurities in the cabin of an aircraft is mitigated by dilution ventilation. The removal of microbials from the breathing space of an aircraft cabin reduces the risk of airborne infection. Current disease models suggest that some benefit is obtained by increasing the flow of pathogen free air to the aircraft cabin. Current ventilation air distribution systems provide between 15 and 25 cfm per passenger in economy seating. The ventilation air distribution systems are flowing at the maximum capacity of the ducting of the system and the system fans. Thus, the limited capacity of current air distribution systems in passenger aircraft is a primary problem in reducing the risk of airborne infection.

One solution is to reduce the passenger count, thereby increasing the ventilation flow per person. However, reducing the passenger count is not a popular solution because it drives up the cost of the airline ticket proportionately, wastes fuel, and causes flight delays through the increased aircraft traffic resulting from reducing the number of passengers in each aircraft.

Ultraviolet light sterilizers irradiating ventilation air are very effective in providing pathogen free ventilation air. However, exposing the passengers to the radiation of ultraviolet light is not acceptable.

Filter material, for example felt, could be added to the air ventilation distribution system to remove air suspended impurities. However, in warm, high humidity environments the filter material would absorb moisture from the cool ventilation air, thereby becoming a source of bacterial growth. Additionally, the wet filter material could present the problem of condensation dripping on passengers during open door loading in the humid environment.

SUMMARY

The aircraft of the present invention is provided with an apparatus that reduces the transfer of air suspended impurities in a cabin of an aircraft without increasing the capacity of the existing air distribution system of the aircraft.

The apparatus includes a housing that is positioned in a cavity between a sidewall of the aircraft cabin and a section of a fuselage of the aircraft. The housing has an interior volume that communicates with the cabin interior through an air return opening in the sidewall of the cabin and an air outlet opening in the sidewall of the cabin.

A ventilation air supply duct extends from the source of ventilation air of the aircraft, through the cavity between the cabin sidewall and the section of the fuselage of the aircraft and to the housing. The ventilation air supply duct is connected to the housing and communicates a supply of ventilation air to the housing interior.

At least one nozzle is positioned in the housing interior. The nozzle is connected in communication with the ventilation air supply duct and receives the ventilation air communicated by the supply duct. The nozzle is constructed to produce a jet of air from the ventilation air received. The nozzle directs the jet of air through the housing interior, through the air outlet opening in the cabin sidewall and into the cabin interior. The jet of air from the nozzle also creates a low pressure area in the housing interior.

The air return opening in the sidewall of the cabin communicates the cabin interior with the low pressure area in the housing interior. The low pressure area in the housing interior draws air from the cabin through the air return opening and into the housing interior. The air drawn into the housing interior is entrained into the jet of air directed from the nozzle and flows with the jet of air through the housing interior and back into the cabin interior.

A device in the housing interior removes air suspended impurities from the air drawn into the housing interior through the air return opening. The device can be a filter, a germicidal lamp, or a combination of both.

A condensation drain is also provided on the housing of the apparatus. The drain allows any moisture that drips from a filter employed in the housing and/or any water that condenses from the cold ventilation air supplied to the nozzle in warm, high humidity environments to drain from the housing.

In the above manner, the apparatus of the invention increases the total apparent filtered ventilation air to the aircraft cabin without enlarging the ventilation system of the aircraft.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 5 is a representation of the flow paths of primary airflow through the apparatus and entrained airflow through the apparatus.

DESCRIPTION

The aircraft of the present invention is provided with an apparatus that reduces the transfer of air suspended impurities in a cabin of an aircraft without increasing the capacity of the existing air distribution system of the aircraft.

Figure 1:
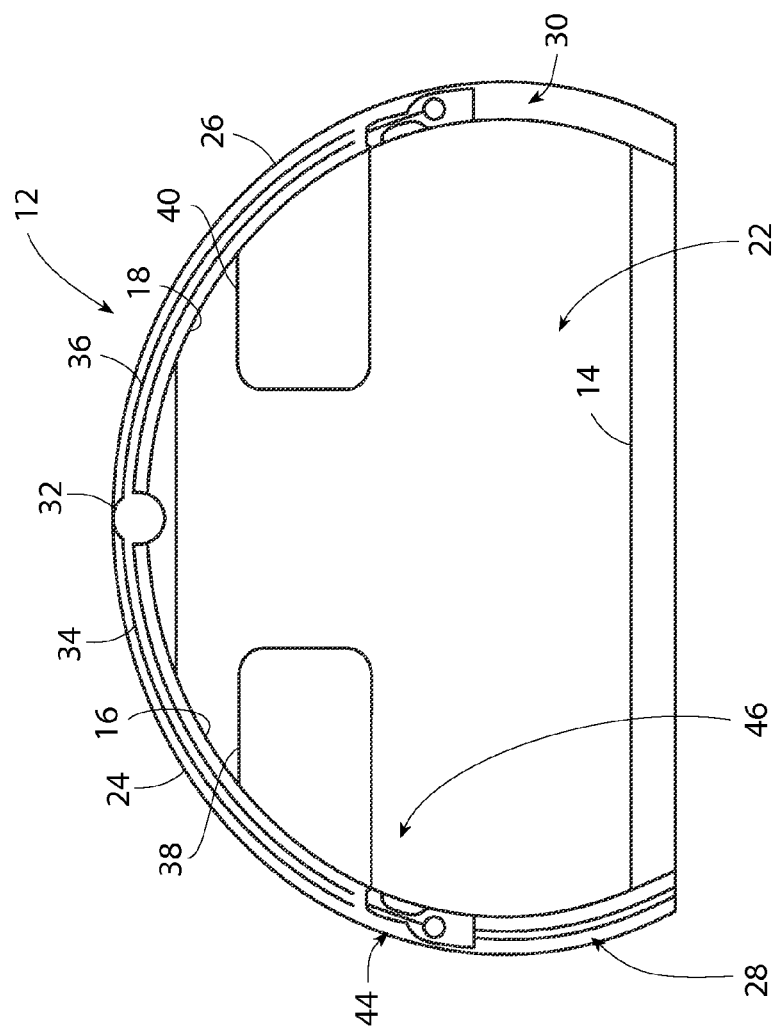
FIG. 1 is a representation of a cross-section view of an aircraft employing the apparatus of the invention showing the opposite outboard sidewalls of the aircraft cabin and the cavity between the cabin sidewalls and exterior sections of the aircraft fuselage.

FIG. 1 is a representation of a cross-section view of a typical an aircraft employing the cabin air entrainment filtration system with a condensation drain of the apparatus of the invention. The aircraft 12 is basically comprised of a floor having a floor surface 14, and cabin sidewalls 16, 18 extending around opposite sides of the aircraft cabin interior 22. Sections of the aircraft fuselage 24, 26 extend around the respective sidewalls 16, 18 and enclose cavities 28, 30 between the sidewalls 16, 18 and the sections of fuselage 24, 26.

The ventilation system of the aircraft 12 includes a source of ventilation air 32 represented schematically in FIG. 1. The source of ventilation air 32 provides a flow of cool ventilation air to the aircraft cabin interior. The flow of ventilation air is supplied from the air source 32 to air flow ducts 34, 36 that extend through the cavities 28, 30 between the respective cabin sidewalls 16, 18 and the exterior sections of the aircraft fuselage 24, 26. The flow of ventilation air from the source of ventilation 32 can be driven by one or more fans or other equivalent means currently employed in aircraft. Typically, the flow of ventilation air is directed through a plurality of ducts 34, 36 and into the cabin interior 22 through a plurality of air outlet openings in the cabin sidewalls 16, 18 just below the stowage bins 38, 40 of the aircraft. It should therefore be understood that although only a pair of ducts 34, 36 are shown in FIG. 1 extending through the respective cavities 28, 30 in the laterally opposite sides of the aircraft 12, the source of ventilation 32 could be providing flows of cool ventilation air through pluralities of similar ducts that are spatially arranged in the cavities along the longitudinal length of the aircraft.

To simplify the description of the apparatus 44, the apparatus will be described in association with only one of the air ducts 34 that extends through the cavity 28 between the cabin sidewall 16 and the aircraft fuselage section 24. It should be understood that the apparatus 44 can be employed with each of the plurality of air ducts 34, 36 positioned in the cavities 28, 30 between the respective cabin sidewalls 16, 18 and the aircraft fuselage sections 24, 26. Thus, a plurality of the apparatus would be positioned along the cavities 28, 30.

FIG. 1 shows the positioning of the apparatus 44 relative to the aircraft 12. The apparatus 44 is positioned in the cavity 28 between the cabin sidewall 16 and the aircraft fuselage section 24. The apparatus 44 is positioned vertically in the cavity 28 adjacent a passenger breathing zone 46 of the cabin interior. The breathing zone 46 is approximately the height of a passenger's head above the floor surface 14 when seated in the aircraft.

Figure 2:
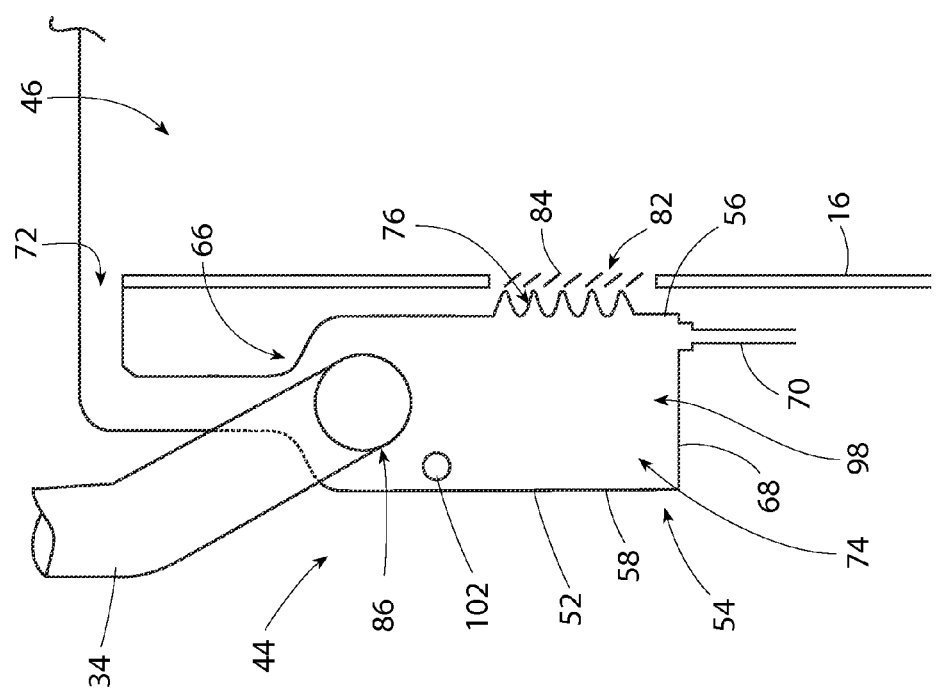
FIG. 2 is a representation of an enlarged view of the apparatus of the invention shown in FIG. 1.

FIG. 2 shows an enlarged view of the apparatus 44 positioned to the left in FIG. 1. It should be understood that the apparatus 44 positioned to the right in FIG. 1 is a mirror image of that shown in FIG. 2.

Figure 3:
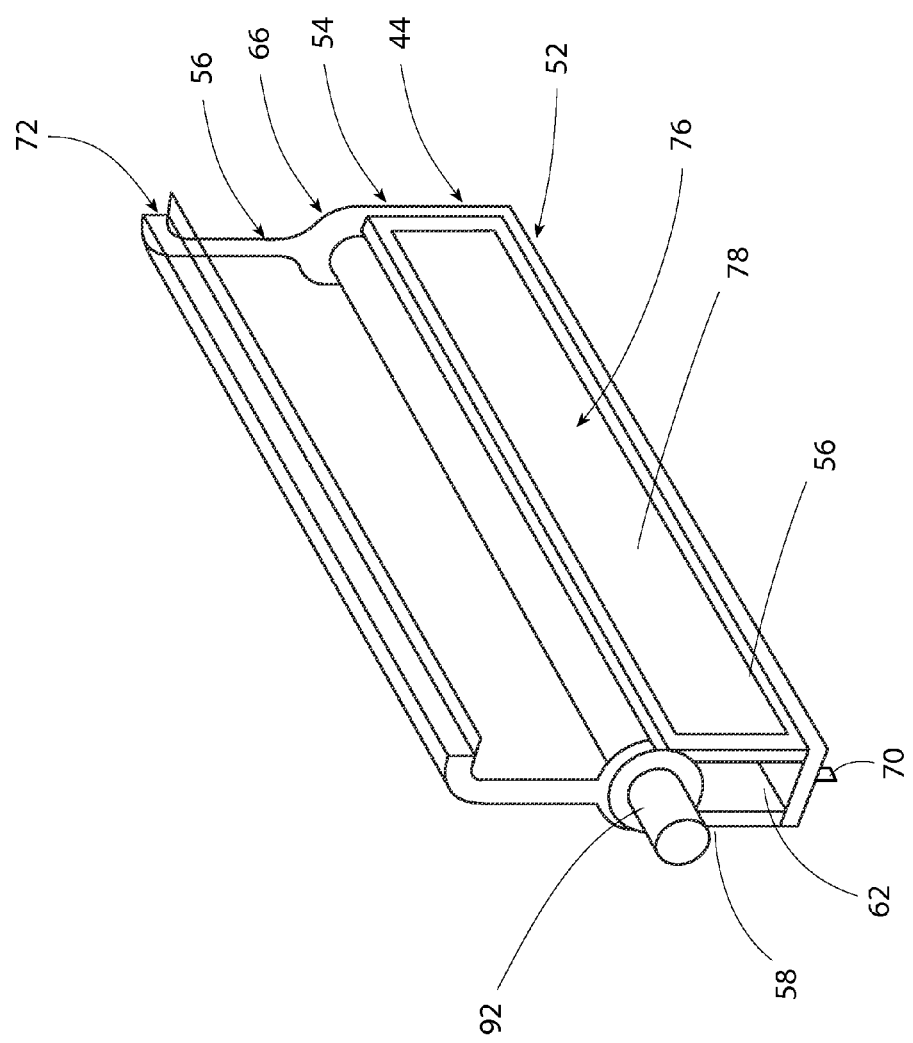
FIG. 3 is a representation of a perspective view of the apparatus.
Figure 4:
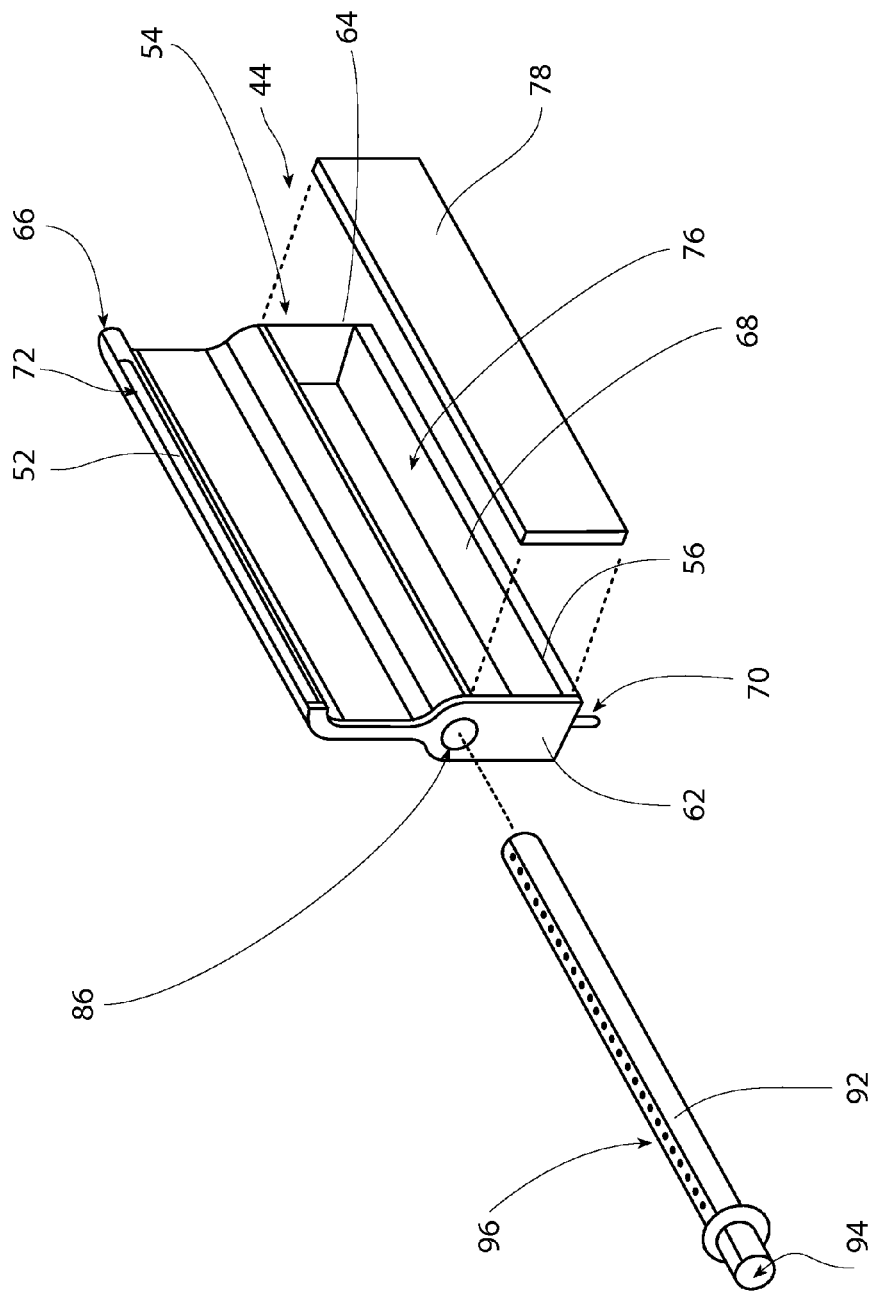
FIG. 4 is a representation of a perspective view of the apparatus similar to that of FIG. 3, but showing the apparatus disassembled.

Referring to FIGS. 2, 3 and 4, the apparatus 44 includes a housing 52 positioned in the cavity 28 between the cabin sidewall 16 and the aircraft fuselage section 24. The housing 52 has a large lower portion 54. The lower portion 54 has a general elongate cube configuration defined by lower portions of laterally spaced first 56 and second 58 sidewalls of the housing, lower portions of longitudinally spaced first 62 and second 64 end walls of the housing and a bottom wall 68 of the housing. The bottom wall 68 has a drain hole and a drain tube 70 extending downwardly from the bottom wall. The housing also has a smaller upper portion 66 that extends upwardly from the lower portion 54. As the upper portion 66 extends upwardly the first 56 and second 58 sidewalls of the housing merge toward each other and form the housing upper portion 66 as a narrow flue with a rectangular cross-section. The housing upper portion 66 at first extends straight upwardly from the housing lower portion 54, but then bends through a curve as it extends to an air outlet opening 72 at the opposite end of the housing upper portion 66 from the housing lower portion 54. As shown in FIGS. 1 and 2, the air outlet opening 72 of the housing 52 is positioned in the cabin sidewall 16 just below the stowage bin 38 of the aircraft cabin and communicates an interior volume 74 of the housing 52 with the cabin interior 22.

A drawn air inlet opening 76 is provided through the first sidewall 56 of the housing 52. The drawn air inlet opening 76 has, for example a rectangular configuration and occupies much of the first sidewall 56. A filter 78 can be positioned in the drawn air inlet opening 76. The filter 78 would provide a device for removing airborne impurities in air drawn into the housing interior 74 through the drawn air inlet opening 76 in a manner to be explained. Alternatively, the apparatus 44 could be employed without the filter 78.

An air return opening 82 is provided in the aircraft cabin sidewall 16 adjacent the drawn air inlet opening 76 of the housing 52. The air return opening 82 can be covered with a decorative grill, with louvers, overlapping fins or slats or other equivalent types of ventilating openings 84 that allow air to pass through the openings but block the view of a passenger in the cabin interior 22 into the cavity 28.

A ventilation air inlet opening 86 is provided in the first end wall 62 of the housing 52. As shown in the drawing figures, the ventilation air inlet opening 86 is positioned in the first end wall 62 toward the top of the lower housing portion 54 where the lower housing portion begins to merge into the upper housing portion 66. The ventilation duct 34 extending through the cavity 28 is connected to the first end wall 62 of the housing 52 at the ventilation air inlet opening 86. In this manner, the source of ventilation air 32 communicates through the duct 34 with the housing interior 74 and supplies a flow of air through the duct 34 and the ventilation air inlet opening 86 to the housing interior 74.

A hollow diffuser tube 92 extends longitudinally through the housing interior 74. Opposite ends of the diffuser tube 92 are connected to the opposed interior surfaces of the first end wall 62 and the second end wall 64 of the housing. The hollow interior 94 of the diffuser tube 92 communicates through the ventilation air inlet opening 86 in the housing first end wall 62 with the ventilation air duct 34 connected to the housing. As seen in the drawing figures, the diffuser tube 92 is straight and extends straight through the housing. Other equivalent configurations of the diffuser tube could be employed other than that shown. With the diffuser tube 92 communicating with the ventilation air inlet opening 86, the diffuser tube 92 is positioned toward the top of the housing lower portion 54 just where the housing lower portion begins to merge into the housing upper portion 66. A plurality of holes extend through the top of the diffuser tube 94 and communicate the interior of the diffuser tube with the housing interior 74. The plurality of holes form nozzles 96 that are spatially arranged in a straight line across the top of the diffuser tube 92 and are directed upwardly toward the center of the housing upper portion 66. With all of the nozzles 96 directed upwardly through the housing upper portion 66, when a flow of ventilation air from the ventilation air source 32 is directed through the duct 34 and the ventilation air inlet opening 86 into the interior of the diffuser tube 92, the nozzles 96 direct jets of the air upwardly through the interior of the housing upper portion 66 and out through the air outlet opening 72 of the housing into the cabin interior 22. The jets of air directed from the nozzles 96 create a low-pressure area 98 in the housing interior 74 toward the bottom of the housing lower portion 54 on an opposite side of the diffuser tube 92 from the nozzles. This low-pressure area 98 in the housing interior 74 communicates through the drawn air inlet opening 76 of the housing and the air return opening 82 of the cabin sidewall 16 to draw air from the cabin interior 22 into the low-pressure area 98 of the housing. This air drawn into the housing interior 74 is then entrained into the flow of air produced by the jets of air from the nozzles 96 and travels through the housing upper portion 66 and the housing air outlet opening 72 and is returned to the cabin interior 22.

Referring to FIG. 2, a device 102 is provided in the housing interior 74 that removes air suspended impurities from the air drawn into the housing interior through the drawn air inlet opening 76 of the housing and the air return opening 82 of the cabin sidewall 16. The device 102 could be an additional filter, a germicidal lamp, or a combination of both. In the embodiment of the apparatus shown in FIG. 2 the device 102 is an ultraviolet light sterilizer that irradiates the air drawn into the low-pressure area 98 of the housing through the housing drawn air inlet opening 76 and the air return opening 82 in the cabin sidewall 16. The ultraviolet light destroys microbials and other impurities carried by the air drawn into the low-pressure area 98 of the housing interior that penetrates the filter 78, or pass through the drawn air inlet opening 76 when a filter is not employed. The ultraviolet light 102 is positioned in the housing interior 74 where the light cannot pass through the louvers or other equivalent mechanisms of the air return opening 82 in the cabin sidewall 16 and subject passengers to the ultraviolet light or enable the ultraviolet light to be seen by passengers.

Thus, the apparatus 44 described above reduces the transfer of air suspended impurities in the aircraft cabin interior 22. Referring to FIG. 5, when a flow of air is supplied from the source of ventilation air 32 through the ducting 34 to the nozzles 96 in the housing interior 74, the nozzles produce jets of air 104 directed from the nozzles into the housing upper portion 66, through the housing air outlet opening 72 and into the aircraft cabin interior 22. The jets of air 104 produced by the nozzles 96 also create an area of low pressure 98 in the housing lower portion 54. The area of low pressure 98 draws air 106 from the cabin interior 22 through the air return opening 82 in the cabin sidewall 16, through the drawn air inlet opening 76 in the housing 52 and into the low-pressure area 98 of the housing 52. The air 106 drawn into the low-pressure area 98 is irradiated with ultraviolet light from the ultraviolet light sterilizer 102. The irradiated air 108 is then entrained and mixed with the jets of air 104 from the nozzles 96 and returned with the jets of air to the cabin interior 22.

In the above manner, the apparatus of the invention increases the total apparent filtered ventilation air to the aircraft cabin without enlarging the ventilation system of the aircraft.

As various modifications could be made in the constructions of the apparatus and the methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

The invention claimed is:

1. A method for reducing transfer of air suspended impurities in a cabin of an aircraft, wherein a housing containing a nozzle is positioned between a sidewall of the cabin and a section of a fuselage of the aircraft, the housing having a housing lower portion and a housing upper portion with the housing upper portion extending upwardly from the housing lower portion to an air outlet opening at an opposite end of the housing upper portion from the housing lower portion, the housing lower portion having a bottom wall and a drain hole in the bottom wall, the air outlet opening being positioned in the sidewall of the cabin, the method comprising:

supplying a flow of air to the nozzle and producing a jet of air directed upwardly from the nozzle through the housing upper portion, through the air outlet opening and into the cabin with the jet of air creating a low pressure area in the housing lower portion between the sidewall of the cabin and the section of the aircraft fuselage;

drawing air from the cabin through an air return opening in the sidewall, through a drawn air inlet opening in a side of the housing and into the low pressure area in the housing lower portion, the air return opening and the drawn air inlet opening in the side of the housing communicating the low pressure area in the housing lower portion with the cabin;

condensing moisture from the air drawn into the low pressure area in the housing lower portion and draining the moisture from the housing lower portion through the drain hole in the housing bottom wall;

irradiating the air drawn into the low pressure area with ultra-violet light; and mixing the irradiated air with the jet of air from the nozzle and returning the irradiated air mixed with the jet of air to the cabin.

2. The method of claim 1, further comprising:
filtering the air drawn into the low pressure area and then irradiating the air drawn into the low pressure area.

3. The method of claim 1, further comprising:
blocking the ultra-violet light from passing through the air return opening and entering the cabin.

4. The method of claim 1, further comprising:
drawing air from the cabin to supply the flow of air to the nozzle.

5. The method of claim 1, further comprising:
positioning a plurality of nozzles between the sidewall of the cabin and the section of the fuselage of the aircraft; supplying a flow of air to the plurality of nozzles and producing jets of air into the cabin with the jets of air producing low pressure areas between the sidewall of the cabin and the section of the fuselage of the aircraft.

6. An aircraft having an apparatus for reducing transfer of air suspended impurities in a cabin of the aircraft, the apparatus comprising:

a housing in the aircraft, the housing having a housing lower portion and a housing upper portion enclosing an interior of the housing, the housing upper portion extending upwardly from the housing lower portion to an air outlet opening at an opposite end of the housing upper portion from the housing lower portion, the air outlet opening being positioned in a sidewall of the aircraft communicating the housing interior with the cabin of the aircraft, the housing lower portion having a drawn air inlet opening in a side of the housing lower portion and the housing lower portion having a bottom wall with a drain hole in the bottom wall;

a supply of ventilation air communicating with the housing interior;

a nozzle in the housing interior, the nozzle receiving the ventilation air communicated with the housing interior and directing a jet of air upwardly from the housing interior, through the housing upper portion, through the air outlet opening and into the cabin, the jet of air creating a low pressure area in the housing interior;

at least one return air opening communicating the cabin with the low pressure area in the housing interior through the drawn air inlet opening in the side of the housing lower portion where the low pressure area in the housing interior draws air from the cabin through the at least one return air opening, through the drawn air inlet opening and into the housing interior; and, a device inside the housing interior that removes suspended impurities from the air drawn into the housing interior.

7. The apparatus of claim 6, wherein the device that removes suspended impurities in the air drawn into the housing interior comprises a germicidal lamp.

8. The apparatus of claim 6, wherein the device that removes suspended impurities in the air drawn into the housing interior comprises a filter.

9. The apparatus of claim 6, wherein the housing is positioned between a sidewall of the cabin and a section of a fuselage of the aircraft.

10. The apparatus of claim 9, wherein the at least one return air opening is in the sidewall of the cabin.

11. The apparatus of claim 10, further comprising:

a ventilation air supply duct extending between the sidewall of the cabin and the section of the fuselage of the aircraft and connected with the housing, the ventilation air supply duct communicating the ventilation air with the housing interior.

12. The apparatus of claim 11, further comprising:

a tube in the housing interior, the ventilation air supply duct being connected with the tube and communicating the ventilation air with the tube; and, the nozzle being on the tube.

13. The apparatus of claim 12, wherein the nozzle is one of a plurality of separate nozzles on the tube.

14. The apparatus of claim 9, wherein the housing is one of a plurality of separate housings positioned between the sidewall of the cabin and the section of the fuselage of the aircraft, each housing of the plurality of housings having the housing interior communicating with the supply of ventilation air, the nozzle receiving the ventilation air supplied to the housing interior and directing the jet of air from the housing interior into the cabin with the jet of air creating the low pressure area in the housing interior, the at least one return air opening communicating the cabin with the low pressure area in the housing interior whereby the low pressure area draws air from the cabin through the at least one return air opening and into the housing interior, and the device inside the housing interior that removes suspended impurities from the air drawn into the housing interior.

15. An aircraft having an apparatus for reducing transfer of air suspended impurities in a cabin of the aircraft, the apparatus comprising:

a housing positioned between a sidewall of the cabin and a section of a fuselage of the aircraft, the housing having a housing lower portion and a housing upper portion, the housing upper portion extends upwardly from the housing lower portion to an air outlet opening at an opposite end of the housing upper portion from the housing lower portion, the air outlet opening being positioned in the sidewall of the cabin communicating an interior of the housing with the cabin through the sidewall, the housing lower portion having a drawn air inlet opening in a side of the housing lower portion and a bottom wall and a drain hole in the bottom wall that allows moisture in the housing interior to drain from the housing interior through the drain hole in the bottom wall;

a ventilation air supply duct extending between the sidewall of the cabin and the section of the aircraft fuselage, the ventilation air supply duct being connected to the housing and communicating a supply of ventilation air to the housing interior;

a nozzle in the housing interior and connected in communication with the ventilation air supply duct, the nozzle being constructed to receive the supply of ventilation air communicated by the ventilation air supply duct to the housing interior and to produce a jet of air directed from the nozzle, through the housing interior and into the cabin with the jet of air creating a low pressure area in the housing interior;

at least one return air opening in the sidewall of the cabin providing communication between the cabin and the low pressure area in the housing interior whereby the low pressure area draws air from the cabin through the at least one return air opening and into the housing interior where the air is entrained into the jet of air directed from the nozzle, through the housing interior and into the cabin; and, a device in the housing interior that removes air suspended impurities from the air drawn into the housing interior.

16. The apparatus claim 15, wherein the device that removes suspended impurities from the air drawn into the housing interior comprises a germicidal lamp.

17. The apparatus of claim 15, wherein the device that removes suspended impurities from the air drawn into the housing interior comprises a filter.

18. The apparatus of claim 15, wherein the housing is one of a plurality of separate housings positioned between the sidewall of the cabin and the section of the fuselage of the aircraft, each housing of the plurality of housings having the housing interior communicating with the supply of ventilation air, the nozzle receiving the ventilation air supplied to the housing interior and directing the jet of air from the housing interior into the cabin with the jet of air creating the low pressure area in the housing interior, the at least one return air opening communicating the cabin with the low pressure area in the housing interior whereby the low pressure area draws air from the cabin through the at least one return air opening and into the housing interior, and the device inside the housing interior that removes suspended impurities from the air drawn into the housing interior.

* * * * *